US006917667B2

(12) United States Patent
Fujinawa et al.

(10) Patent No.: US 6,917,667 B2
(45) Date of Patent: Jul. 12, 2005

(54) METHOD AND APPARATUS FOR MAKING PARALLEL X-RAY BEAM AND X-RAY DIFFRACTION APPARATUS

(75) Inventors: Go Fujinawa, Hamura (JP); Hitoshi Okanda, Hachioji (JP)

(73) Assignee: Rigaku Corporation, Akishima (JP)

( * ) Notice: Subject to any disclaimer, the term of this patent is extended or adjusted under 35 U.S.C. 154(b) by 125 days.

(21) Appl. No.: 10/654,349

(22) Filed: Sep. 2, 2003

(65) Prior Publication Data

US 2004/0066896 A1 Apr. 8, 2004

(30) Foreign Application Priority Data

Sep. 3, 2002 (JP) ....................................... 2002-258065

(51) Int. Cl.[7] ................................................ G01N 23/20
(52) U.S. Cl. .............................. 378/70; 378/71; 378/84
(58) Field of Search .............................. 378/70, 71, 79, 378/81, 82, 84, 85, 147, 148, 92

(56) References Cited

U.S. PATENT DOCUMENTS

| | | | | |
|---|---|---|---|---|
| 6,226,349 B1 | * | 5/2001 | Schuster et al. .............. | 378/84 |
| 6,504,900 B2 | * | 1/2003 | Kondo et al. ................. | 378/70 |
| 6,665,372 B2 | * | 12/2003 | Bahr et al. ................... | 378/71 |
| 6,704,390 B2 | * | 3/2004 | Kogan ......................... | 378/84 |
| 2002/0080916 A1 | | 6/2002 | Jiang et al. | |

FOREIGN PATENT DOCUMENTS

| | | |
|---|---|---|
| JP | 11-287773 | 10/1999 |
| JP | 2002-039970 A | 2/2002 |
| JP | 2003-194744 A | 7/2003 |

OTHER PUBLICATIONS

European Search Report for European Application No. EP 03 01 9566.

Patent Abstracts of Japan, vol. 2003, No. 05, May 12, 2003, abstract of JP Publication No. 2003–014894 A (Rigaku Corp), published Jan. 15, 2003.

Patent Abstracts of Japan, vol. 2000, No. 21, Aug. 3, 2001, abstract of JP Publication No. 2003–099994 A (Rigaku Corp), published Apr. 13, 2001.

Patent Abstracts of Japan, vol. 1999, No. 08, Jun. 30, 1999, abstract of JP Publication No. 11–072595 A (Rigaku Corp), published Mar. 16, 1999.

* cited by examiner

*Primary Examiner*—Craig E. Church
*Assistant Examiner*—Irakli Kiknadze
(74) *Attorney, Agent, or Firm*—Frishauf, Holtz, Goodman & Chick, P.C.

(57) ABSTRACT

Parallel X-ray beams with two kinds of wavelength are made with the use of a single parabolic multilayer mirror. A single parabola prepared for a CuKa X-ray is used for making parallel X-ray beams of both the CuKa X-ray and the CoKa X-ray. The CuKa ray emitted from a first X-ray focal spot located at the focus of the parabola is reflected at a reflecting surface composed of the parabola to become a parallel beam going out. When a second X-ray focal spot is arranged at the position apart from the first X-ray focal spot by a predetermined distance, the CoKa X-ray emitted from the second X-ray focal spot is reflected at the same reflecting surface to become a parallel beam going out.

9 Claims, 12 Drawing Sheets

FIG. 5

SPECIFICATIONS OF PARABOLIC MULTILAYER MIRROR
DEPENDING ON TARGET MATERIAL OF X-RAY TUBE

| TUBE | WAVELENGTH (nm) | CURVATURE ρ | LAMINATION PERIOD d (nm) | | | BRAGG'S ANGLE θ (deg) | | |
|---|---|---|---|---|---|---|---|---|
| | | | L=80mm | L=100mm | L=120mm | L=80mm | L=100mm | L=120mm |
| Ag | 0.055936 | 0.011565 | 3.290 | 3.678 | 4.029 | 0.487 | 0.436 | 0.398 |
| Mo | 0.070930 | 0.018600 | 3.290 | 3.678 | 4.029 | 0.618 | 0.553 | 0.504 |
| Cu | 0.154058 | 0.087760 | 3.290 | 3.678 | 4.029 | 1.342 | 1.200 | 1.096 |
| Co | 0.178897 | 0.118380 | 3.290 | 3.678 | 4.029 | 1.558 | 1.394 | 1.272 |
| Fe | 0.193604 | 0.138650 | 3.290 | 3.678 | 4.029 | 1.686 | 1.508 | 1.377 |
| Cr | 0.228970 | 0.193940 | 3.290 | 3.678 | 4.029 | 1.994 | 1.784 | 1.628 |

METHOD AND APPARATUS FOR MAKING PARALLEL X-RAY BEAM AND X-RAY DIFFRACTION APPARATUS

BACKGROUND OF THE INVENTION

1. Field of the Invention

The present invention relates to a method and an apparatus for making parallel X-ray beams with two kinds of wavelength with the use of a parabolic multilayer mirror. The present invention also relates to an X-ray diffraction apparatus equipped with the apparatus for making parallel X-ray beams.

2. Description of the Related Art

The prior art for taking parallel X-ray beams with two kinds of wavelength is disclosed in Japanese Patent Publication 2002-39970 A (2002). In the prior art, X-rays with different wavelengths can be easily prepared in the measurement using the X-ray. That is, a plurality of X-ray generation devices are provided. In order to use parallel beams with two kinds of wavelength, an X-ray source for a first wavelength along with a parabolic multilayer mirror specific thereto and another X-ray source for a second wavelength along with a parabolic multilayer mirror specific thereto are used separately.

In the above-described prior art, a combination of an X-ray source and a parabolic multilayer mirror specific thereto must be prepared in order to switch the wavelength of the X-ray.

SUMMARY OF THE INVENTION

It is an object of the present invention to provide a method and an apparatus capable of taking parallel X-ray beams with two kinds of wavelength with the use of a single parabolic multilayer mirror, and to provide an X-ray diffraction apparatus equipped with such an apparatus for taking parallel X-ray beam.

A method for taking parallel X-ray beam of the present invention comprises the steps of: (a) preparing a parabolic multilayer mirror having a reflecting surface with a parabolic shape determined based on a first wavelength; (b) arranging a first X-ray focal spot, which generates an X-ray with the first wavelength, at a position of a focus of the parabolic shape, and emitting the X-ray with the first wavelength from the first X-ray focal spot, so as to be reflected at the parabolic multilayer mirror to obtain a parallel X-ray beam with the first wavelength; and (c) arranging a second X-ray focal spot, which generates an X-ray with a second wavelength different from the first wavelength, at a position displaced from the focus of the parabolic shape in a direction perpendicular to an axis of the parabolic shape by a predetermined distance, and emitting the X-ray with the second wavelength from the second X-ray focal spot so as to be reflected at the parabolic multilayer mirror to obtain a parallel X-ray beam with the second wavelength.

An apparatus for taking parallel X-ray beam of the present invention comprises: (a) a parabolic multilayer mirror having a reflecting surface with a parabolic shape determined based on a first wavelength; (b) a first X-ray focal spot which can be arranged at a position of a focus of the parabolic shape and which generates an X-ray with the first wavelength; and (c) a second X-ray focal spot which can be arranged at a position displaced from the focus of the parabolic shape in a direction perpendicular to an axis of the parabolic shape by a predetermined distance and which generates an X-ray with a second wavelength different from the first wavelength.

An X-ray diffraction apparatus of the present invention includes the above-described apparatus for taking parallel X-ray beam. In the X-ray diffraction apparatus, an X-ray beam emitted from an X-ray source is incident on a specimen and an X-ray diffracted by the specimen is detected with an X-ray detector. The X-ray diffraction apparatus comprises: (a) a parabolic multilayer mirror having a reflecting surface with a parabolic shape determined based on a first wavelength; (b) a first X-ray focal spot which can be arranged at a position of a focus of the parabolic shape and which generates an X-ray with the first wavelength; (c) a second X-ray focal spot which can be arranged at a position displaced from the focus of the parabolic shape in a direction perpendicular to an axis of the parabolic shape by a predetermined distance and which generates an X-ray with a second wavelength different from the first wavelength; and (d) the X-ray source capable of realizing the first X-ray focal spot and the second X-ray focal spot.

Furthermore, in the X-ray diffraction apparatus according to the present invention, a switching system between a para-focusing method and a parallel beam method can be combined and, therefore, the above-described X-ray diffraction apparatus further includes: (a) a first incident path which allows the X-ray beam with a predetermined angle of divergence to be incident on the specimen; (b) a second incident path which allows the X-ray beam to become a parallel beam by reflection at the parabolic multilayer mirror and to be incident on the specimen; (c) a selection slit device capable of opening any one of the first incident path and the second incident path and interrupting the other; (d) the X-ray source arranged in order that a generation point of an X-ray in the case of using the first incident path coincides with a generation point of an X-ray in the case of the second incident path, for an X-ray with the same wavelength; and (e) a specimen support device arranged in order that a center point of the specimen in the case of using the first incident path coincides with a center point of the specimen in the case of using the second incident path, for an X-ray with the same wavelength.

Using the method for taking parallel X-ray beam of the present invention, parallel X-ray beams with two kinds of wavelength can be taken with the use of a single parabolic multilayer mirror.

BRIEF DESCRIPTION OF THE DRAWINGS

FIG. 5 shows a table of specifications of a parabolic multilayer mirror depending on the target material of an X-ray tube.

DESCRIPTION OF THE PREFERRED EMBODIMENTS

First of all, a multilayer mirror used for the present invention will be described. The multilayer mirror has a reflecting surface with a parabolic shape. A relative positional relationship between the multilayer mirror and an X-ray source is determined in order that the X-ray source is located on the position of the focus of the parabola. An X-ray beam emitted from the X-ray source is reflected at the reflecting surface to become a parallel beam. This reflecting surface is composed of a synthetic multilayer film in which heavy elements and light elements are alternately laminated, and a lamination period thereof (corresponding to a d-spacing of a crystal) continuously varies along the parabola to become a graded d-spacing. A parabolic multilayer mirror prepared for a specific wavelength satisfies Bragg's law at every position on the reflecting surface with respect to the X-ray with the specific wavelength. This type of parabolic multilayer mirror is disclosed in, for example, Japanese Patent Publication 11-287773 A (1999). This multilayer mirror selectively reflects an X-ray with a specific wavelength to prepare a parallel beam and, therefore, is a monochromator as well.

FIG. 5 shows a table indicating specifications of a parabolic multilayer mirror. The curvature and the lamination period of the parabolic multilayer mirror vary depending on the target material, that is, depending on the wavelength of the characteristic X-ray emitted from the target, noting that the lamination periods "d" have the same value approximately in the table. This table relates to a Kα characteristic X-ray of each target material, but another characteristic X-ray, e.g., Kβ (the wavelength is different from that of Kα although the material is the same) can be used, provided that another multilayer mirror specific thereto must be prepared.

Figure 1:
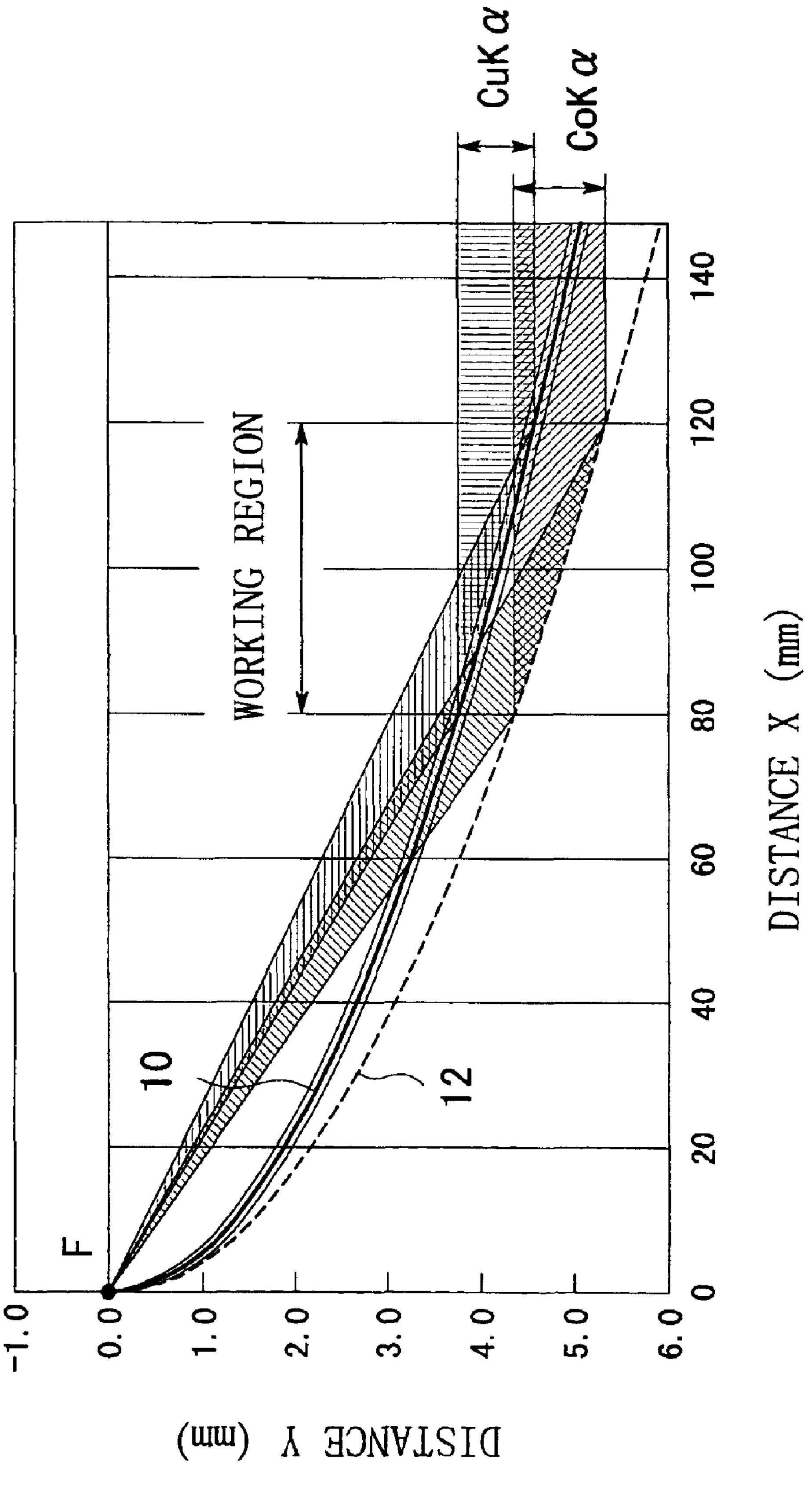
FIG. 1 is a graph showing a parabola for the CuKα X-ray and another parabola for the CoKα X-ray drawn in order that the axes and the vertexes of the two parabolas coincide with each other.

Next, the principle of the present invention will be described. FIG. 1 is a graph showing a parabola 10 for a CuKα X-ray and another parabola 12 for a CoKα X-ray drawn in order that the axes and the vertexes of the two parabolas coincide with each other. The abscissa of the graph represents the distance X measured from the vertex along the axis of the parabola. The ordinate represents the distance Y measured from the vertex in a direction perpendicular to the axis of the parabola. Strictly speaking, each of the focuses F of the parabolas 10 and 12 is present at a position apart from the position of the vertex by a slight distance in the forward direction of X. However, since the parabola of the multilayer mirror has an extremely flat shape, the distance between the focus F and the vertex of the parabola is extremely small. Therefore, the focus F is indicated at the position of the vertex of the parabola.

This parabolic multilayer mirror is so designed that the region where the distance X is 80 to 120 mm is to be used. Consequently, a CuKα X-ray from the focus F is reflected at the position where the distance X is 80 to 120 mm on the parabola 10 to become a parallel beam. On the other hand, a CoKα X-ray from the focus F is reflected at the position where the distance X is 80 to 120 mm on the parabola 12 to become a parallel beam as well.

Figure 2:
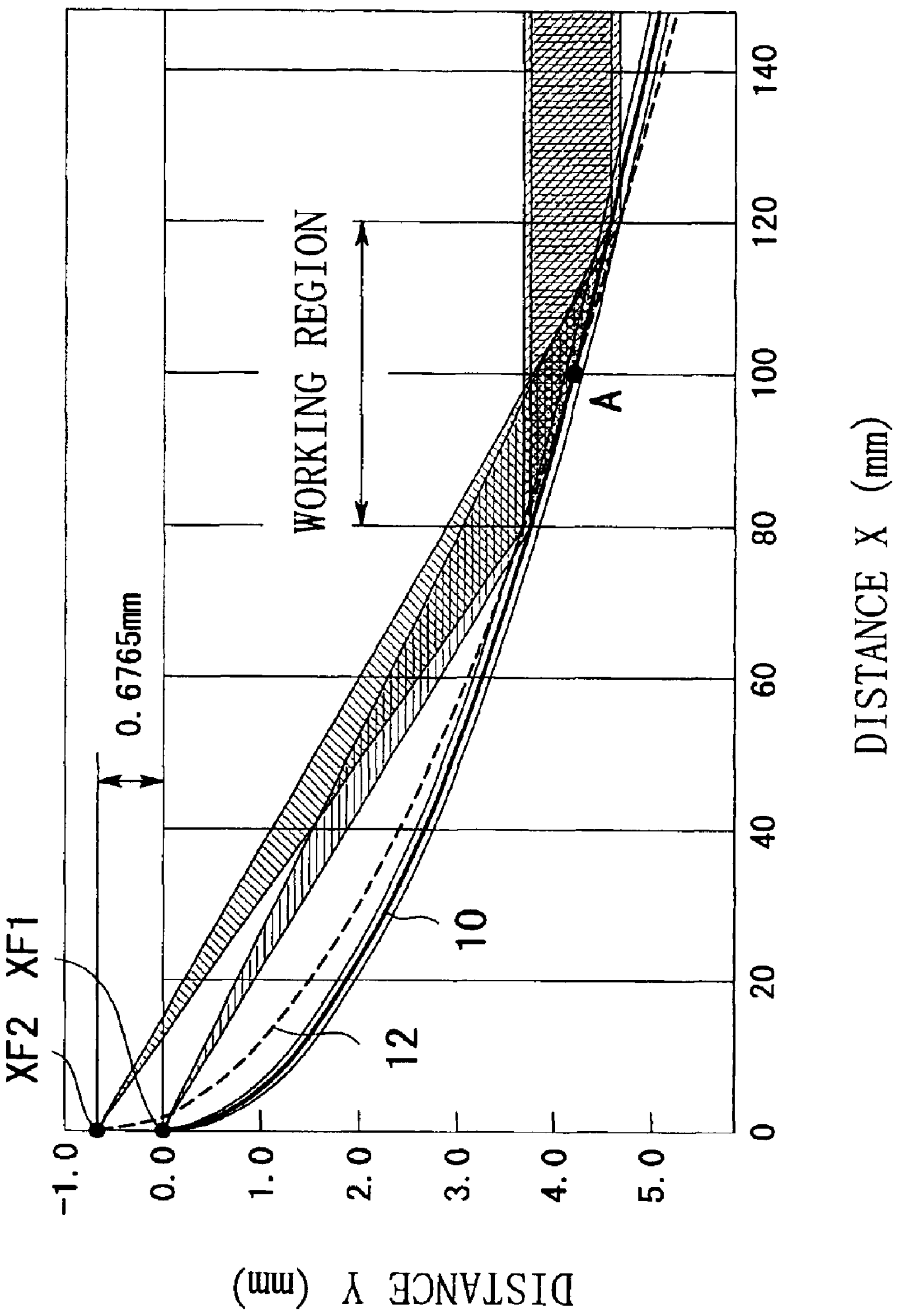
FIG. 2 is a graph showing the result of translation of the parabola for the CoKα X-ray shown in FIG. 1.

In FIG. 1, please assume that the parabola 12 is translated upward in order that the two parabolas 10 and 12 intersect at the center position of the multilayer mirror where X=100 mm. FIG. 2 is a graph showing the result of the translation. The parabolas 10 and 12 intersect at the point A where X=100 mm, the parabola 12 being shifted upward by 0.6765 mm from the position in the condition shown in FIG. 1.

Figure 3:
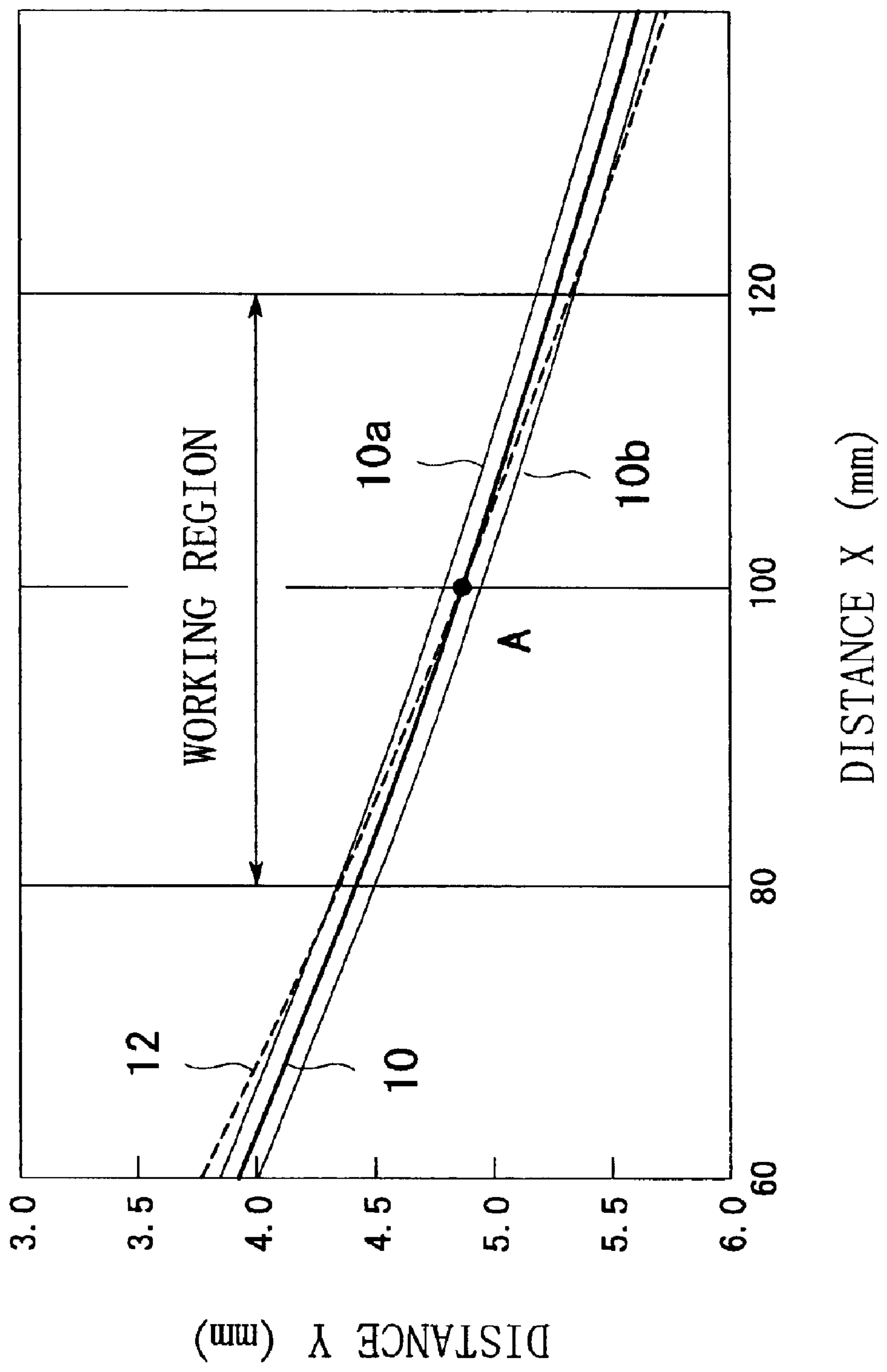
FIG. 3 is an enlarged graph for the neighborhood of X=80 to 120 mm of the graph shown in FIG. 2.

FIG. 3 is an enlarged graph for the neighborhood of X=80 to 120 mm of the graph shown in FIG. 2. The two parabolas 10 and 12 intersect at the point A. Narrow lines 10*a* and 10*b* are drawn in both sides of one parabola 10 to indicate the allowable width of the parabola 10. This allowable width refers to that a CuKα X-ray can be reflected if a reflecting surface is present within the allowable width. An actual X-ray source has a finite focus width (for example, in a normal focus X-ray tube, the focus width is 0.1 mm), and the reflection characteristic of a multilayer mirror has the tolerance typified by the rocking curve width (for example, in the order of 0.05 degree). These phenomena create the above-described allowable width.

Comparing the allowable width of the parabola 10 for the CuKα X-ray with the parabola 12 for the CoKα X-ray, it is seen that the parabola 12 for the CoKα X-ray is located within the allowable width of the parabola 10 for the CuKα X-ray within the range of the working region where X is 80 to 120 mm. This refers to that the CoKα X-ray can also be reflected, i.e., a parallel beam can be taken, with the use of the parabolic multilayer mirror for the CuKα X-ray within the range where X is 80 to 120 mm.

Referring to FIG. 2 again, the CuKα X-ray emitted from a first X-ray focal spot XF1 located at the focus of the parabola 10 can be reflected at a reflecting surface indicated by the parabola 10 in the region where X is 80 to 120 mm to become a parallel beam which goes out rightward. When a second X-ray focal spot XF2 is arranged at a distance of 0.6765 mm above from the first X-ray focal spot XF1, a CoKα X-ray emitted from the second X-ray focal spot XF2 can be reflected at the reflecting surface indicated by the same parabola 10 in the region where X is 80 to 120 mm to become a parallel beam which goes out rightward. The CuKα X-ray and the CoKα X-ray can be reflected at the same reflecting surface, and the positions from which the parallel beams can be taken substantially overlap each other.

As described above, when two wavelengths are appropriately selected, parallel X-ray beams with two wavelengths can be separately taken with the use of the same parabolic multilayer mirror. Combinations other than the above-described combination (taking of the CoKα X-ray with the use of the mirror for the CuKα X-ray) are possible: for example, a CuKα X-ray and a FeKα X-ray can be taken with the use of the mirror for the CoKα X-ray.

Next, an X-ray tube used for performing the present invention will be described. Most generally, separate X-ray tubes are used for two respective X-ray wavelengths. In this case, for example, an X-ray tube having a Cu target and another X-ray tube having a Co target are movably mounted on the same base, and one of the X-ray tube, suitable for the wavelength to be used, may be arranged at the position of the first X-ray focal spot XF1 or the second X-ray focal spot XF2 in the graph shown in FIG. 2.

Figure 6A:
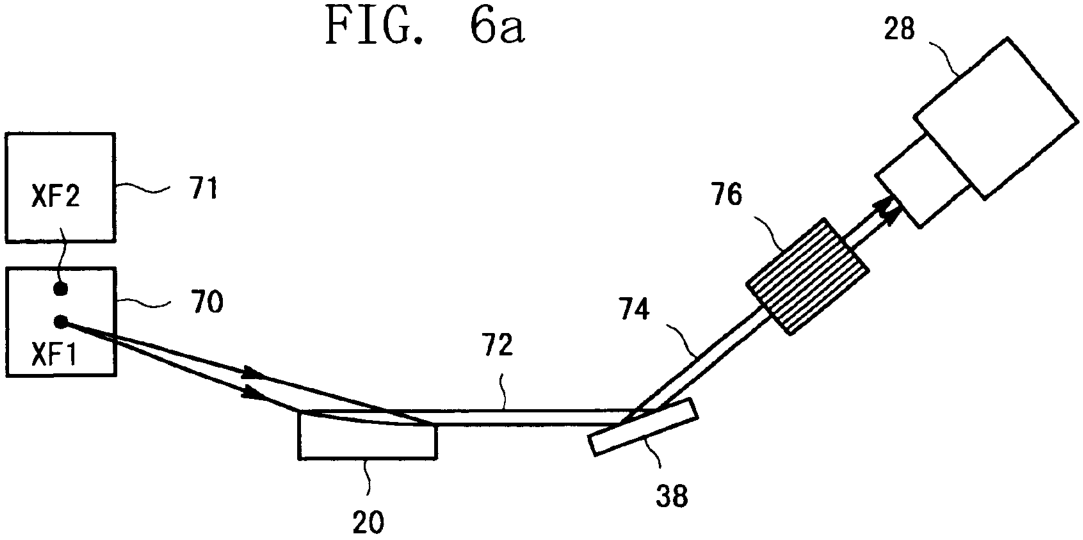
FIGS. 6*a* and 6*b* are plan views showing two types of condition of an X-ray diffraction apparatus realizing a method for taking parallel beam with the use of two X-ray tubes.

An example, in which the method for taking parallel beam with the use of two X-ray tubes is applied to an X-ray diffraction apparatus, will be described with reference to FIGS. 6*a* and 6*b*. A rotary anode X-ray tube 70 having a Cu target and another rotary anode X-ray tube 71 having a Co target are prepared. A parabolic multilayer mirror 20 has a reflecting surface composed of a parabola designed for a CuKα X-ray, as shown in FIG. 2. In order to use the CuKα X-ray for the X-ray diffraction measurement, as shown in FIG. 6*a*, the two X-ray tubes 70 and 71 are moved, so that the focal spot of the Cu-target X-ray tube 70 is adjusted at the position of the focus XF1 of the parabola of the multilayer mirror 20, that is, the position of the first X-ray focal spot XF1 shown in FIG. 2. Next, only the X-ray tube 70 is operated, and the CuKα X-ray emitted from the X-ray tube 70 is reflected at the multilayer mirror 20 to become a parallel beam 72 going out. This parallel beam 72 is incident on a specimen 38. The X-ray 74 diffracted by the specimen 38 passes through a Soller slit 76 and is detected with an X-ray detector 28.

Figure 6B:
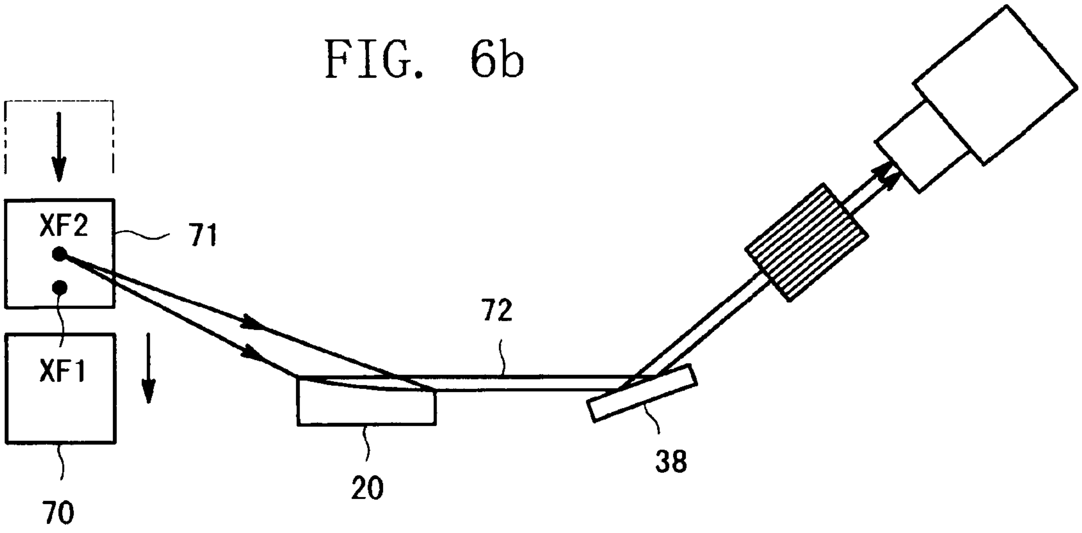

On the other hand, in order to use the CoKα X-ray for the X-ray diffraction measurement, as shown in FIG. 6*b*, the two X-ray tubes 70 and 71 are moved, so that the focal spot of the Co-target X-ray tube 71 is adjusted at the position of the second X-ray focal spot XF2 shown in FIG. 2. Next, only the X-ray tube 71 is operated, and the CoKα X-ray emitted from the X-ray tube 71 is reflected at the multilayer mirror 20 to become a parallel beam 72 going out.

Figure 7:
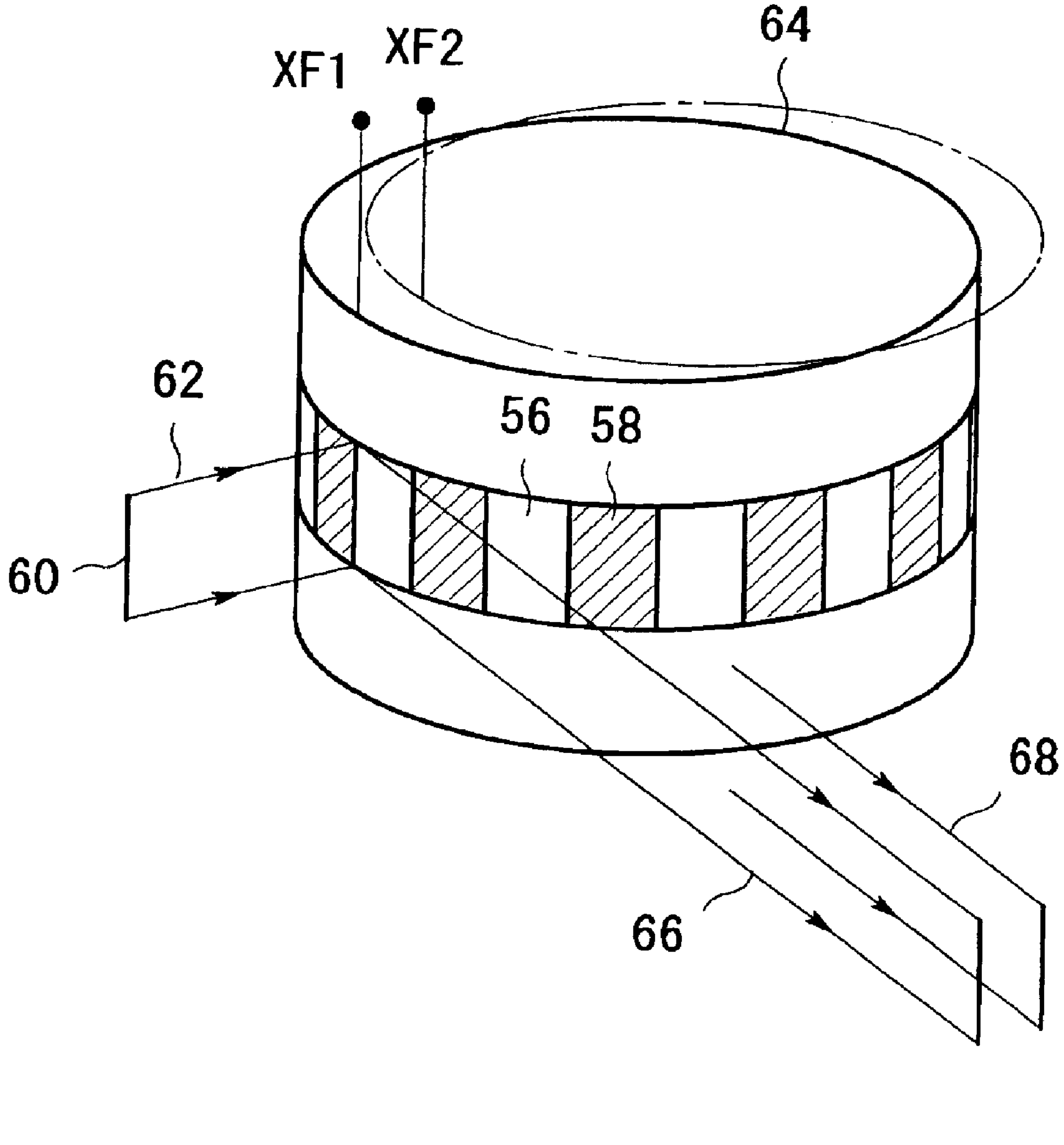
FIG. 7 is a perspective view of a zebra-type rotary anode.

Next, the use of a single X-ray tube capable of generating X-rays of two kinds of wavelength will be described. FIG. 7 is a perspective view of a zebra-type rotary anode 64. A Cu target material 56 and a Co target material 58 are alternately arranged on the outer surface of the rotary anode 64 along the circumferential direction. When an electron beam 62 is incident, from a filament 60, on the rotary anode 64, an X-ray from the Cu target material 56 and another X-ray from the Co target material 58 can be taken as an X-ray beam 66 in a mixed state. In this case, the X-ray from the Cu target material 56 and the X-ray from the Co target material 58 are generated from the same focal spot when viewed from the direction of taking of the X-ray.

In the condition shown in the drawing, the X-ray beam 66 is generated from the position of the first X-ray focal spot XF1 when viewed from above. Although this X-ray beam 66 includes the CuKα X-ray and the CoKα X-ray, only the CuKα X-ray satisfies the reflection condition shown in FIG. 2 and, therefore, a parallel beam of the CuKα X-ray is taken from the multilayer mirror. On the other hand, in order to take the CoKα X-ray from the multilayer mirror, the rotary anode 64 is shifted to the position indicated by an imaginary line shown in FIG. 7, so that an X-ray beam 68 is generated from the position of the second X-ray focal spot XF2. Although this X-ray beam 68 also includes the CuKα X-ray and the CoKα X-ray, only the CoKα X-ray satisfies the reflection condition shown in FIG. 2 and, therefore, a parallel beam of the CoKα X-ray is taken from the multilayer mirror.

Figure 8A:
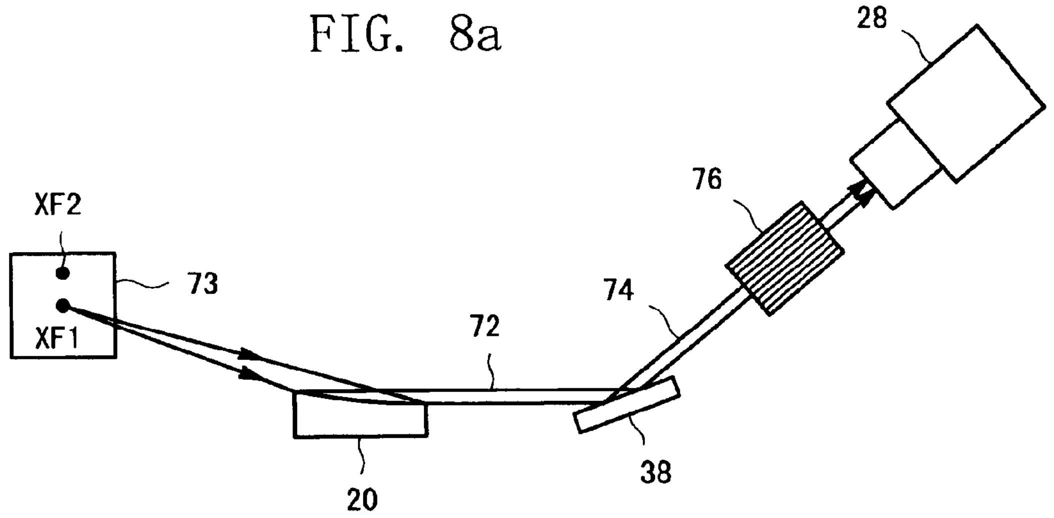
FIGS. 8*a* and 8*b* are plan views showing two types of condition of an X-ray diffraction apparatus realizing a method for taking parallel beam with the use of the X-ray tube shown in FIG. 7.

Next, an example, in which the method for taking parallel beam with the use of the X-ray tube shown in FIG. 7 is applied for an X-ray diffraction apparatus, will be described with reference to FIGS. 8*a* and 8*b*. An X-ray tube 73 is that having a rotary anode 64 shown in FIG. 7. A parabolic multilayer mirror 20 has a reflecting surface composed of a parabola 10 designed for a CuKα X-ray, as shown in FIG. 2. In order to use the CuKα X-ray for the X-ray diffraction measurement, as shown in FIG. 8*a*, the X-ray tube 73 is moved, so that the focal spot of the X-ray tube 73 is adjusted at the position of the focus of the parabola of the multilayer mirror 20, that is, the position of the first X-ray focal spot XF1 shown in FIG. 2. Consequently, among X-rays generated from the X-ray tube 73, only the CuKα ray is reflected at the multilayer mirror 20 to become a parallel beam 72 going out. This parallel beam 72 is incident on a specimen 38. The X-ray 74 diffracted by the specimen 38 passes through a Soller slit 76 and is detected with an X-ray detector 28.

Figure 8B:
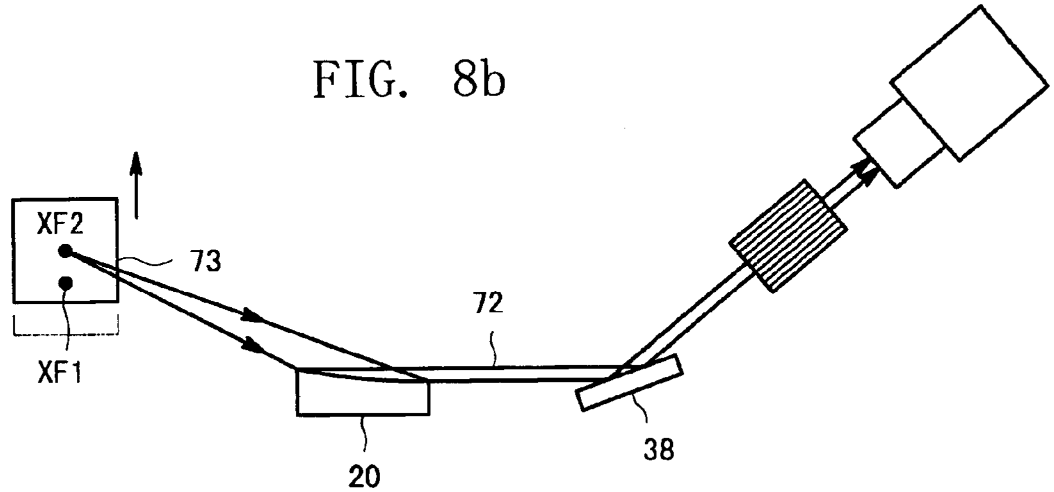

On the other hand, in order to use the CoKα ray for the X-ray diffraction measurement, as shown in FIG. 8*b*, the X-ray tube 73 is moved, so that the focal spot of the X-ray tube 73 is adjusted at the position of the second X-ray focal spot XF2 shown in FIG. 2. Consequently, among X-rays generated from the X-ray tube 73, only the CoKα X-ray can be reflected at the multilayer mirror 20 to become a parallel beam 72 going out.

Figure 4:
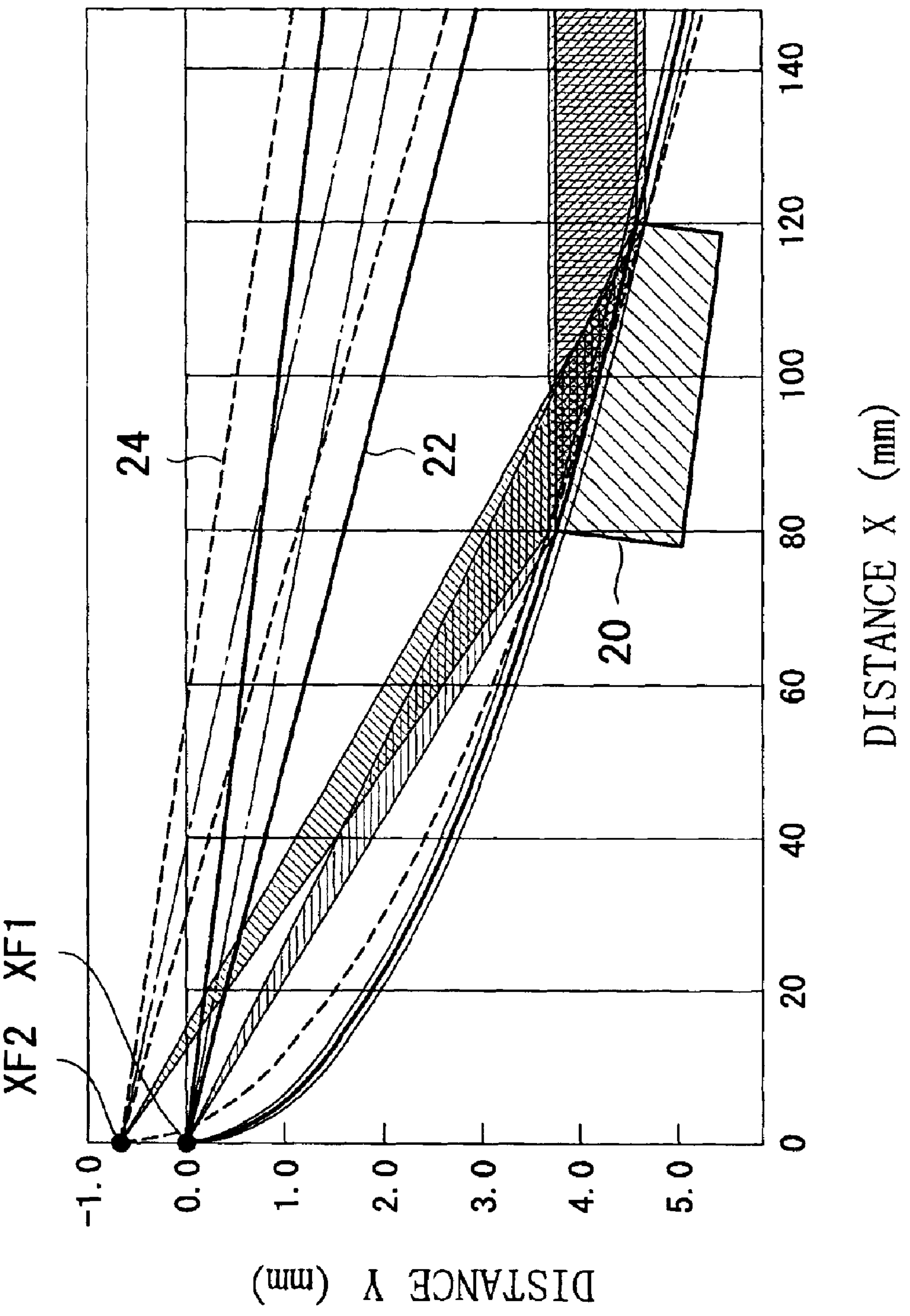
FIG. 4 is a graph in which X-ray paths of the para-focusing method are added to the graph shown in FIG. 2.

Next, an example, in which the method for taking parallel beam of the present invention and a switching system between the para-focusing method and the parallel beam method are combined, will be described. Japanese Patent Publication 2003-194744 A (2003) discloses a technology which can perform easy switching between an incident optical system for the parallel beam method using a parabolic multilayer mirror and an incident optical system for the para-focusing method. In this technology, the parallel beam method and the para-focusing method can be switched by simply switching a selection slit device without changing the positional relationship between an X-ray source and a specimen. Such a technology and the method for taking parallel beam of the present invention can be combined. FIG. 4 is a graph in which X-ray paths for the para-focusing method capable of being switched from the parallel beam are added to the graph shown in FIG. 2.

When the parallel beam of the CuKα X-ray is used, an X-ray generated from the first X-ray focal spot XF1 is reflected at the parabolic multilayer mirror 20 to be taken as a parallel beam. When a measurement using the para-focusing method is performed with the same CuKα X-ray, a divergent X-ray 22 generated from the first X-ray focal spot XF1 is used. On the other hand, when the parallel beam of the CoKα X-ray is used, an X-ray generated from the second X-ray focal spot XF2 is reflected at the parabolic multilayer mirror 20 to be taken as a parallel beam. When a measurement using the para-focusing method is performed with the same CoKα X-ray, a divergent X-ray 24 generated from the second X-ray focal spot XF2 is used. In this manner, each of the two X-ray wavelengths can be used for switching between the parallel beam method and the para-focusing method.

FIGS. 9*a* to 9*d* show an example in which an incident X-ray optical system composed of a combination of the method for taking parallel beam of the present invention and a switching system between the para-focusing method and the parallel beam method is applied to an X-ray diffraction apparatus. These figures show four types of incident optical system in which two kinds of wavelength, that is, a CuKα X-ray and a CoKα X-ray, and two types of system, that is the para-focusing method and the parallel beam method, are combined. In this example, a rotary anode X-ray tube 70 having a Cu target and another rotary anode X-ray tube 71 having a Co target are used. A parabolic multilayer mirror 20 has a reflecting surface composed of a parabola 10 designed for a CuKα X-ray, as shown in FIG. 2. An aperture slit plate

14, a multilayer mirror 20, a selection slit device 18 and a divergent slit 40 are arranged between the X-ray tubes 70 and 71 and a specimen 38 in the described order from the X-ray tube side.

Figure 10:
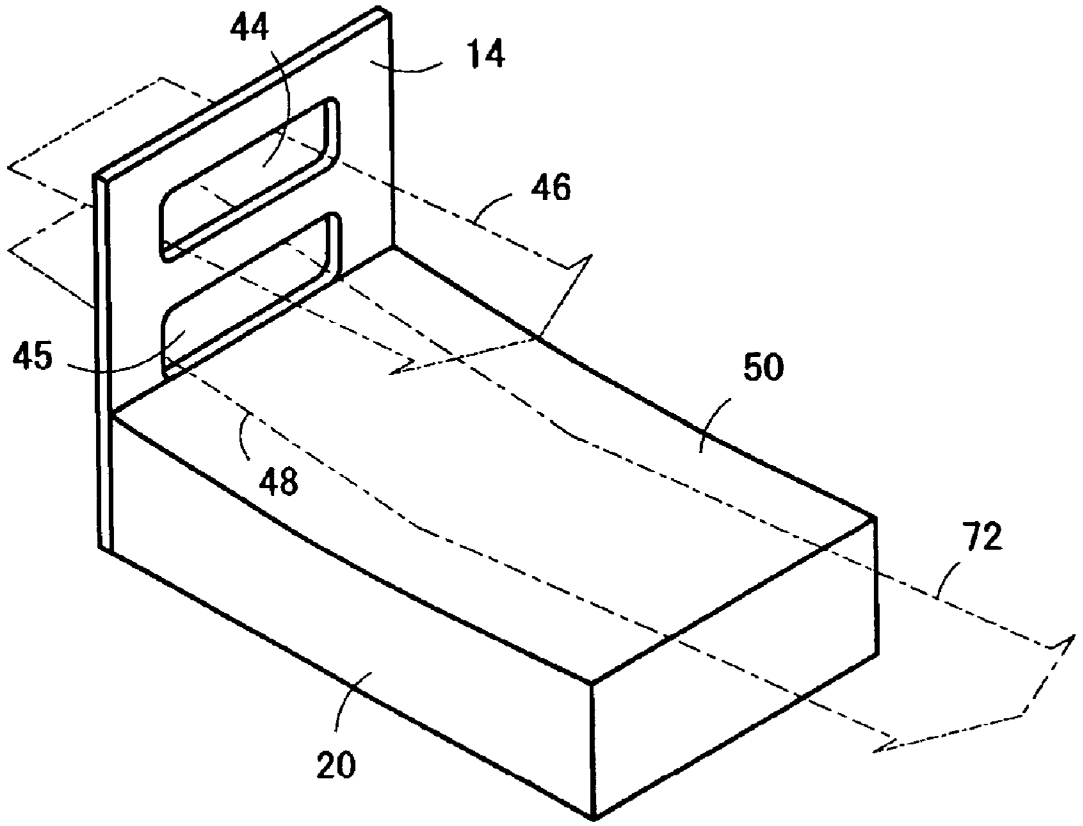
FIG. 10 is a perspective view of an aperture slit plate and a multilayer mirror.

FIG. 10 is a perspective view of the aperture slit plate 14 and the multilayer mirror 20. The aperture slit plate 14 is fixed, with screws, on the end face of the multilayer mirror 20 to become an integral component. The aperture slit plate 14 has a first aperture 44 and a second aperture 45. An X-ray beam 46 having passed through the first aperture 44 travels toward the specimen as it is. An X-ray beam 48 having passed through the second aperture 45 is reflected at a reflecting surface 50 of the multilayer mirror 20 to become a parallel beam 72 which travels toward the specimen.

Figure 11A:
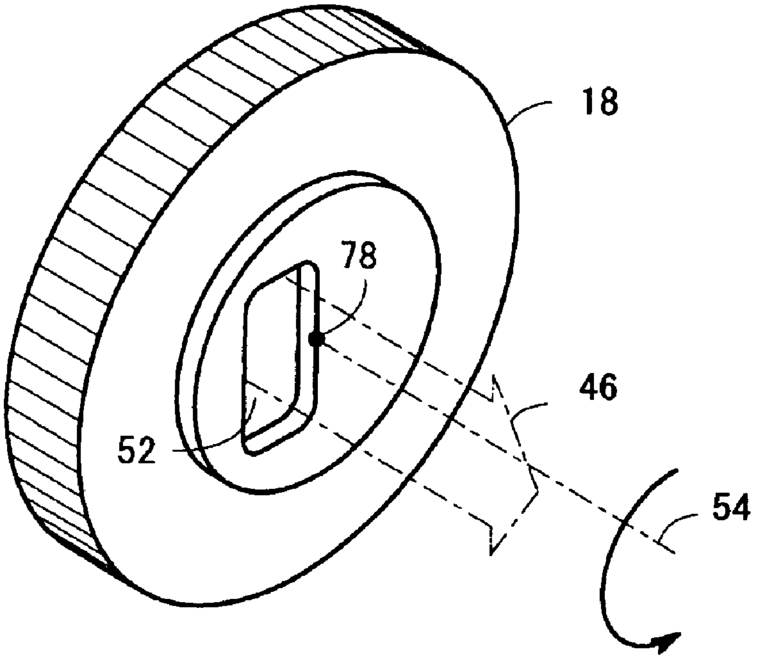
FIGS. 11*a* and 11*b* are perspective views of the two states of a selection slit device.
Figure 11B:
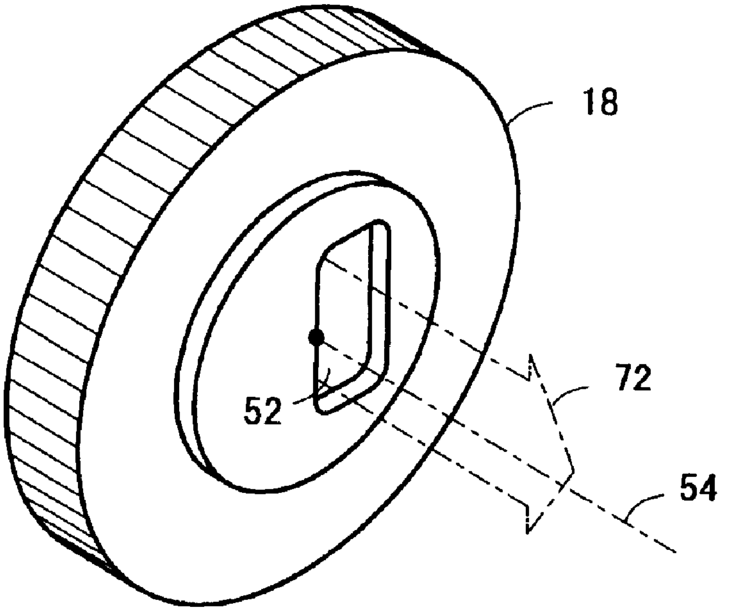

FIGS. 11*a* and 11*b* are perspective views of the two states of the selection slit device 18. As shown in FIG. 11*a*, this selection slit device 18 is substantially in the shape of a disk and has a slender aperture 52 in the vicinity of the center thereof. This selection slit device 18 can be turned by 180 degrees about a center of rotation 54. The position of the aperture 52 is eccentric with respect to the center 78 of the selection slit device 18. In the state shown in FIG. 11*a*, the aperture 52 is located on the left side of the center of rotation 54. When the selection slit device 18 in this state is turned 180 degrees about the center of rotation 54, it becomes the state shown in FIG. 11*b*, the aperture 52 being located on the right side of the center of rotation 54. Only the X-ray beam 46 for the para-focusing method can pass through the aperture 52 in the state shown in FIG. 11*a*, while only the parallel beam 72 (the parallel beam having been reflected at the multilayer mirror) can pass through the aperture 52 in the state shown in FIG. 11*b*.

Figure 9A:
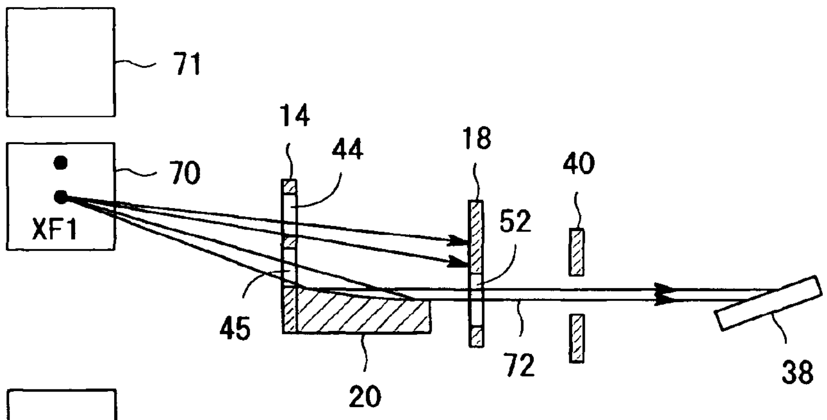
FIGS. 9*a* to 9*d* are plan views showing four types of condition of an X-ray diffraction apparatus equipped with an incident X-ray optical system in which the method for taking parallel beam of the present invention and a switching system between the para-focusing method and the parallel beam method are combined.

Referring to FIG. 9*a* again, in order to perform an X-ray diffraction measurement with the parallel beam method using the CuKα X-ray, the two X-ray tubes 70 and 71 are moved, so that the focal spot of the Cu-target X-ray tube 70 is adjusted at the position of the focus of the parabola of the parabolic multilayer mirror 20, that is, the position of the first X-ray focal spot XF1 shown in FIG. 2. Next, the selection slit device 18 is adjusted to become in the state shown in FIG. 11*b*. Next, only the X-ray tube 70 is operated. Among CuKα X-rays generated from the X-ray tube 70, only the CuKα X-ray having passed through the second aperture 45 of the aperture slit plate 14 is reflected at the multilayer mirror 20 to become a parallel beam 72, which passes through the aperture 52 of the selection slit device 18. On the other hand, an X-ray having passed through the first aperture 44 of the aperture slit plate 14 is interrupted by the selection slit device 18. The divergent slit 40 is sufficiently widened beforehand in order that the parallel beam 72 can pass through. The parallel beam 72 having passed through the divergent slit 40 is incident on a specimen 38. The X-ray diffracted by the specimen 38 passes through a Soller slit and is detected with an X-ray detector in a manner similar to that shown in FIG. 6*a*.

Figure 9B:
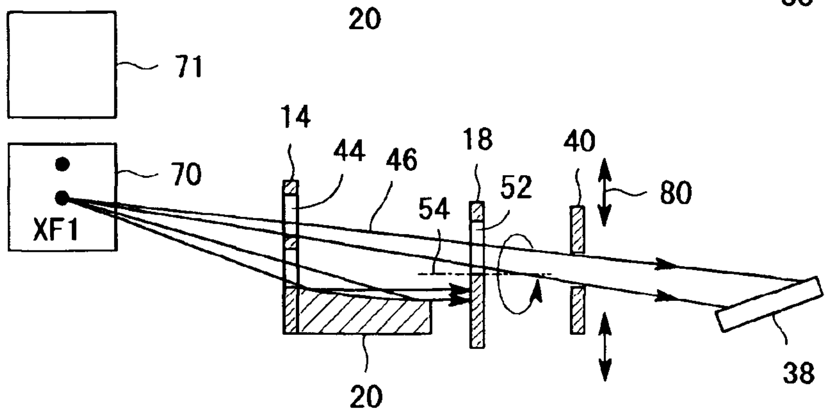

FIG. 9*b* shows the case where an X-ray diffraction measurement is performed with the para-focusing method using the CuKα X-ray. The positions of the two X-ray tubes 70 and 71 are the same positions as those in the case shown in FIG. 9*a*. The selection slit device 18 is turned by 180 degrees about the center of rotation 54 to become the state shown in FIG. 11*a*. Next, only the X-ray tube 70 is operated. Among CuKα X-rays generated from the X-ray tube 70, only an X-ray beam 46 having passed through the first aperture 44 of the aperture slit plate 14 passes through the aperture 52 of the selection slit device 18. This X-ray beam 46 is restricted to have a desired divergent angle by the divergent slit 40 and, thereafter, is incident on the specimen 38. The aperture width of the divergent slit 40 can be controlled by an electric motor, and the divergent slit 40 can be moved in the direction perpendicular to the traveling direction of the X-ray, that is, in the direction indicated by arrows 80 shown in FIG. 9*b*. The X-ray diffracted by the specimen 38 is detected with a detection system in the para-focusing method. The detection system in the para-focusing method will be described below.

Figure 9C:
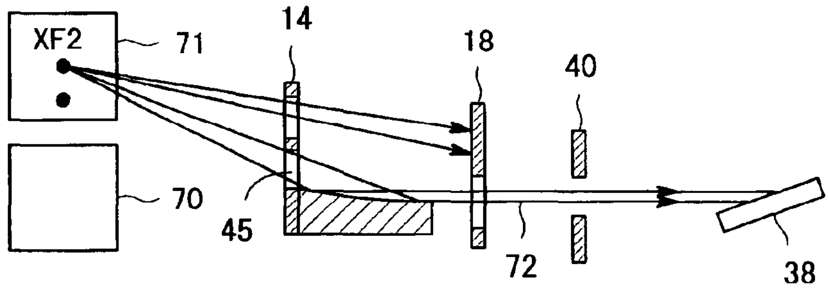

FIG. 9*c* shows the case where an X-ray diffraction measurement is performed with the parallel beam method using the CoKα X-ray. The two X-ray tubes 70 and 71 are moved, so that the focal spot of the Co-target X-ray tube 71 is adjusted at the position of the second X-ray focal spot XF2 shown in FIG. 2. The selection slit device 18 and the divergent slit 40 are adjusted to become in the same state as that shown in FIG. 9*a*. Next, only the X-ray tube 71 is operated. Among CoKα X-rays generated from the X-ray tube 71, only the CoKα X-ray having passed through the second aperture 45 of the aperture slit plate 14 is reflected at the multilayer mirror 20 to become a parallel beam 72, which is incident on the specimen 38.

Figure 9D:
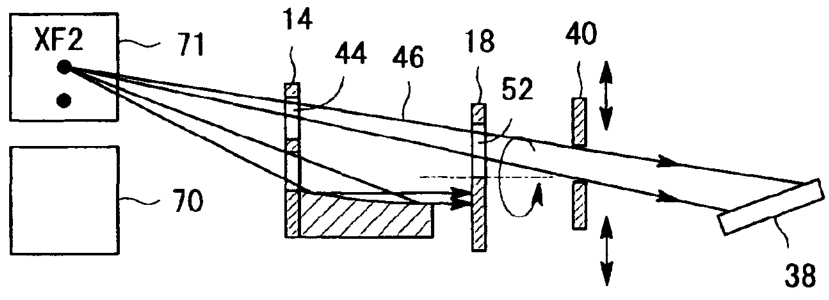

FIG. 9*d* shows the case where an X-ray diffraction measurement is performed with the para-focusing method using the CoKα X-ray. The positions of the two X-ray tubes 70 and 71 are the same positions as those in the case shown in FIG. 9*c*. The selection slit device 18 and the divergent slit 40 are adjusted to become in the same condition as that shown in FIG. 9*b*. Next, only the X-ray tube 71 is operated. Among CoKα X-rays generated from the X-ray tube 71, only the X-ray beam 46 having passed through the first aperture 44 of the aperture slit plate 14 passes through the aperture 52 of the selection slit device 18. This X-ray beam 46 is restricted to have a desired divergent angle by the divergent slit 40 and, thereafter, is incident on the specimen 38.

In the switching between the para-focusing method and the parallel beam method, with respect to the first wavelength (CuKα X-ray), the X-ray path shown in FIG. 9*b* is the first incident path, while the X-ray path shown in FIG. 9*a* is the second incident path. With respect to the second wavelength (CoKα X-ray), the X-ray path shown in FIG. 9*d* is the first incident path, while the X-ray path shown in FIG. 9*c* is the second incident path. With respect to the first wavelength, the position of generation of the X-ray (XF1) and the center position of the specimen 38 in the first incident path coincide with those in the second incident path. With respect to the second wavelength as well, the position of generation of the X-ray (XF2) and the center position of the specimen 38 in the first incident path coincide with those in the second incident path.

As described above, with respect to the X-ray source which generates two kinds of wavelength, one X-ray tube was used in an example and two X-ray tubes were used in another example. The X-ray source, however, is not limited to them. For example, in FIG. 7, when the direction of the taking of the X-ray is changed from the line-focus-taking to the point-focus-taking (the X-ray is taken in the vertical direction in the drawing), and the position of the filament 60 is allowed to move horizontally, the focal spot of the X-ray can be displaced simply by moving the filament 60 without moving the X-ray tube. Furthermore, there can be used an X-ray tube in which it generates the X-ray with the first wavelength and the second wavelength while the position of the generation of the X-ray with the first wavelength and the position of the generation of the X-ray with the second wavelength are displaced from each other by the same distance as the distance between the first X-ray focal spot XF1 and the second X-ray focal spot XF2 shown in FIG. 2. Using such an X-ray source, the present invention can be realized without any movement of the X-ray tube. In addition, when a reflection mirror is used to reflect an X-ray beam in front of the parabolic multilayer mirror, it is unnecessary to actually arrange the X-ray focal spots at the first X-ray focal spot XF1 and the second X-ray focal spot XF2. For example, as if an X-ray focal spot were located on the second X-ray focal spot XF2 when viewed from the multilayer mirror, the X-ray beam of the second wavelength generated from the second X-ray tube located at another position may be incident on the multilayer mirror through the reflection mirror.

Figure 12:
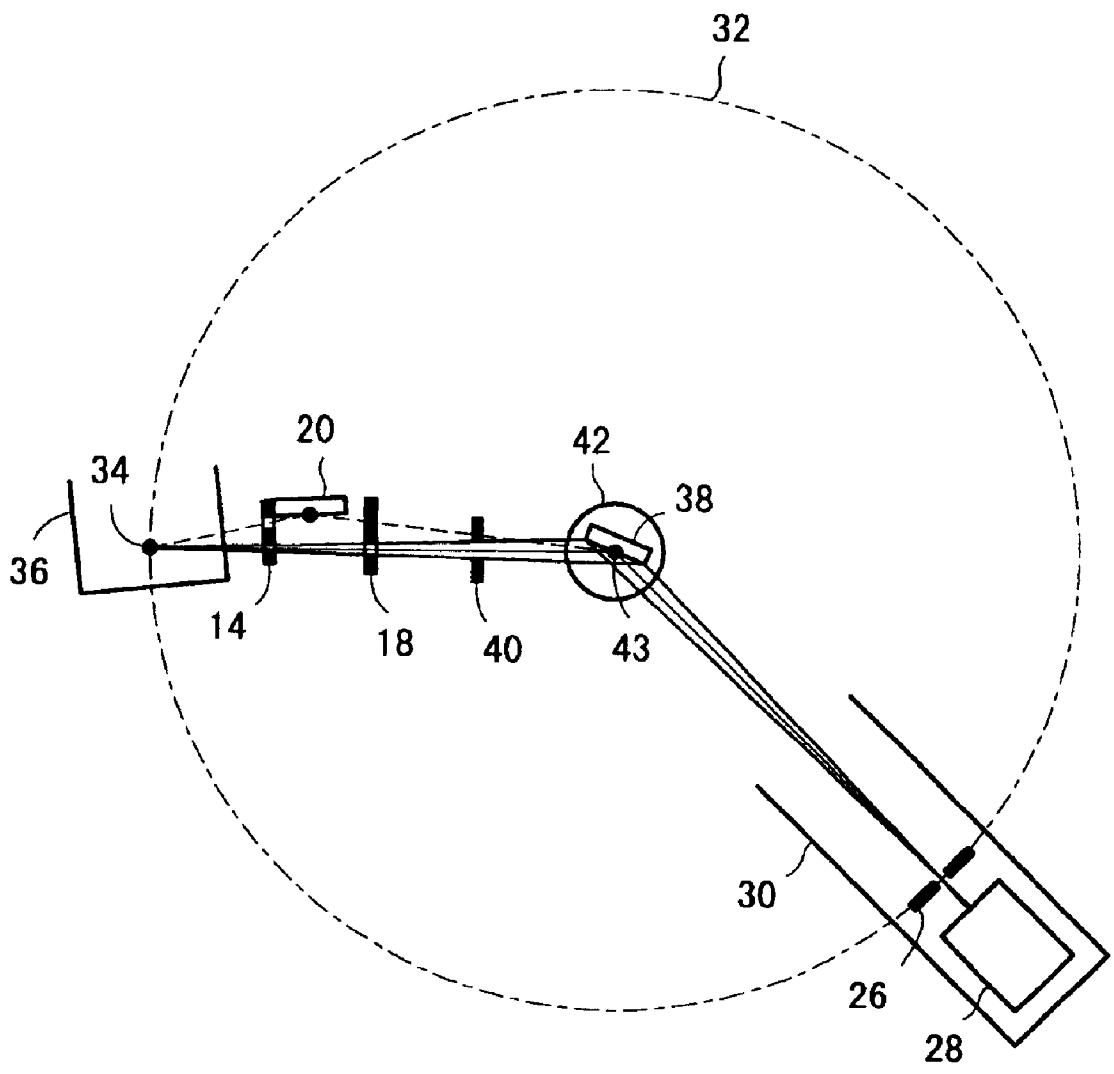
FIG. 12 is a plan view showing the configuration of an X-ray diffraction apparatus in the para-focusing method.

Next, the configuration of an X-ray diffraction apparatus in the para-focusing method will be described with reference to FIG. 12. An aperture slit plate 14, a multilayer mirror 20, a selection slit device 18 and a divergent slit 40 are arranged between the X-ray tube 36 and a specimen 38 in the described order from the X-ray tube side. The specimen 38 is arranged on a specimen support 42, which can be rotated about the center of rotation 43 of a goniometer. A receiving slit 26 and an X-ray detector 28 are arranged on a detector support 30, and the detector support 30 can also be rotated about the center of rotation 43 of the goniometer. The receiving slit 26 and the X-ray focal spot 34 are located on a focusing circle 32 of the goniometer. In order to perform an X-ray diffraction measurement with the para-focusing method, a diffracted X-ray from the specimen 38 is detected using the receiving slit 26 and the X-ray detector 28. The specimen 38 and the detector support 30 are interlocked to rotate with an angular velocity ratio of 1 to 2 so that an X-ray diffraction pattern is obtained.

In order to switch the para-focusing method to the parallel beam method, as described above, the selection slit device 18 is turned by 180 degrees about the center of rotation thereof and, thereby, the center of the divergent slit 40 is adjusted to locate at the center of the parallel beam which comes from the multilayer mirror 20. In order to perform an X-ray diffraction measurement with the parallel beam method, the receiving slit 26 is removed from the detector support 30, or the aperture width of the receiving slit 26 is significantly widened. A Soller slit is arranged in front of the X-ray detector 28. In order to increase the X-ray intensity to be detected, the X-ray detector 28 preferably is brought close to the specimen 38. Therefore, the X-ray detector 28 is allowed to slide in the longitudinal direction of the detector support 30.

Next, there will be described a purpose for which two kinds of X-ray wavelength are separately used. In the X-ray diffraction method, when the absorption coefficient of the specimen is high for the incident X-ray wavelength, there arise the following problems: (1) the background increases due to generation of fluorescent X-rays; and (2) the X-ray penetration ability to the specimen is reduced and, thereby, crystal grains which contribute to the diffraction are decreased and the diffraction intensity is reduced. In consideration of the above-described problems, it is important to select the X-ray wavelength so as to have a small absorption coefficient for the specimen to be measured. Examples of using the CuKα X-ray and the CoKα X-ray will be described. When a diffraction pattern of an $Al_2O_3$ powder is measured, the parallel beam of the CuKα X-ray is used, so that the intensity of the diffracted X-ray is high and the measurement accuracy is increased as compared with those based on the parallel beam of the CoKα X-ray. On the other hand, when a diffraction pattern of a $Fe_3O_4$ powder is measured, the parallel beam of the CoKα X-ray is used, so that the intensity of the diffracted X-ray is high and the background is low as compared with those based on the parallel beam of the CuKα x-ray.

What is claimed is:

1. A method for making parallel X-ray beam, comprising the steps of:

(a) preparing a parabolic multilayer mirror having a reflecting surface with a parabolic shape determined based on a first wavelength;

(b) arranging a first X-ray focal spot, which generates an X-ray with the first wavelength, at a position of a focus of the parabolic shape, and emitting the X-ray with the first wavelength from the first X-ray focal spot, so as to be reflected at the parabolic multilayer mirror to obtain a parallel X-ray beam with the first wavelength; and (c) arranging a second X-ray focal spot, which generates an X-ray with a second wavelength different from the first wavelength, at a position displaced from the focus of the parabolic shape in a direction perpendicular to an axis of the parabolic shape by a predetermined distance, and emitting the X-ray with the second wavelength from the second X-ray focal spot so as to be reflected at the parabolic multilayer mirror to obtain a parallel X-ray beam with the second wavelength.

2. The method for making parallel X-ray beam according to claim 1, wherein the first X-ray focal spot and the second X-ray focal spot are present in the same X-ray tube.

3. The method for making parallel X-ray beam according to claim 1, wherein the X-ray beam with the first wavelength is a CuKα a ray, while the X-ray beam with the second wavelength is a CoKα X-ray.

4. An apparatus for making parallel X-ray beam, comprising:

(a) a parabolic multilayer mirror having a reflecting surface with a parabolic shape determined based on a first wavelength;

(b) a first X-ray focal spot arranged at a position of a focus of the parabolic shape and which generates an X-ray with the first wavelength; and (c) a second X-ray focal spot arranged at a position displaced from the focus of the parabolic shape in a direction perpendicular to an axis of the parabolic shape by a predetermined distance and which generates an X-ray with a second wavelength different from the first wavelength.

5. An X-ray diffraction apparatus, comprising:

(a) a parabolic multilayer mirror having a reflecting surface with a parabolic shape determined based on a first wavelength;

(b) a first X-ray focal spot arranged at a position of a focus of the parabolic shape and which generates an X-ray with the first wavelength;

(c) a second X-ray focal spot arranged at a position displaced from the focus of the parabolic shape in a direction perpendicular to an axis of the parabolic shape by a predetermined distance and which generates an X-ray with a second wavelength different from the first wavelength;

(d) an X-ray source emitting an X-ray beam which is incident on a specimen and realizing the first X-ray focal spot and the second X-ray focal spot; and (e) an X-ray detector detecting an X-ray diffracted by the specimen.

6. The X-ray diffraction apparatus according to claim 5, wherein the X-ray source includes one X-ray tube generating an X-ray with the first wavelength and an X-ray with the second wavelength, and the first X-ray focal spot and the second X-ray focal spot is selectively realized by moving this X-ray tube.

7. The X-ray diffraction apparatus according to claim 5, wherein the X-ray source includes a first X-ray tube which generates an X-ray with the first wavelength and a second X-ray tube which generates an X-ray with the second wavelength, and the first X-ray focal spot and the second X-ray focal spot is selectively realized by moving these X-ray tubes.

8. The X-ray diffraction apparatus according to claim 5, further comprising:

(a) a first incident path which allows the X-ray beam with a predetermined angle of divergence to be incident on the specimen;

(b) a second incident path which allows the X-ray beam to become a parallel beam by reflection at the parabolic multilayer mirror and to be incident on the specimen;

(c) a selection slit device opening any one of the first incident path and the second incident path and interrupting the other;

(d) the X-ray source arranged in order that a generation point of an X-ray in the case of using the first incident path coincides with a generation point of an X-ray in the case of the second incident path, for an X-ray with the same wavelength; and (e) a specimen support device arranged in order that a center point of the specimen in the case of using the first incident path coincides with a center point of the specimen in the case of using the second incident path, for an X-ray with the same wavelength.

9. The X-ray diffraction apparatus according to claim 8, wherein the X-ray source includes a first X-ray tube which generates an X-ray with the first wavelength and a second X-ray tube which generates an X-ray with the second wavelength, and the first X-ray focal spot and the second X-ray focal spot is selectively realized by moving these X-ray tubes.

* * * * *